Feb. 25, 1969  H. STEUER  3,429,193

CONE PULLEY TRANSMISSION

Filed May 19, 1967

INVENTOR.
HERBERT STEUER
BY
Bailey, Stephens + Huettig

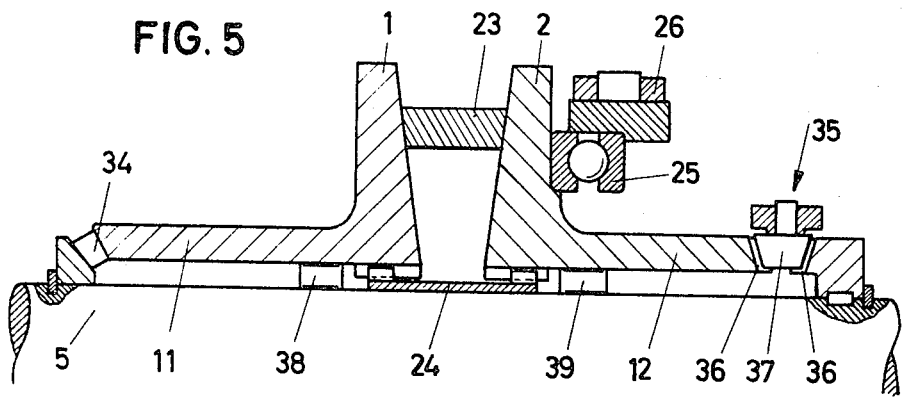
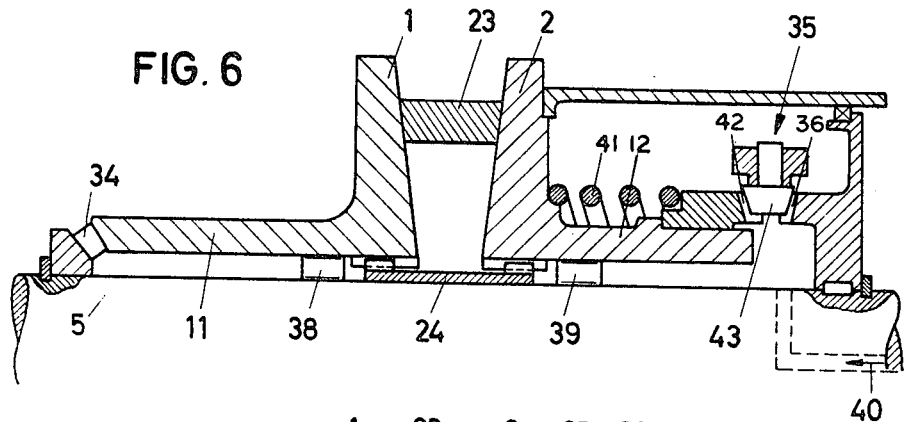
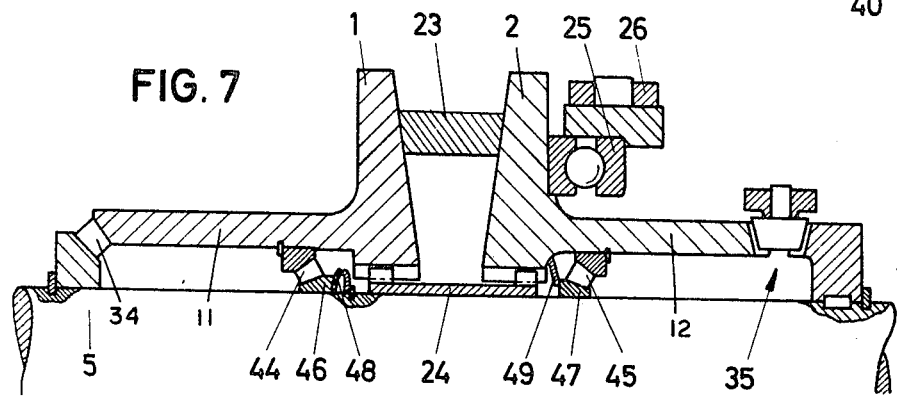

United States Patent Office 3,429,193
Patented Feb. 25, 1969

3,429,193
CONE PULLEY TRANSMISSION
Herbert Steuer, Bad Homburg vor der Hohe, Germany, assignor to Reimers Getriebe A.G., Zug, Switzerland
Filed May 19, 1967, Ser. No. 639,826
Claims priority, application Germany, May 25, 1966, R 43,338
U.S. Cl. 74—230.17        8 Claims
Int. Cl. F16h 55/56

ABSTRACT OF THE DISCLOSURE

A cone pulley transmission in which each of two pulleys which are connected by a belt or chain consists of a pair of conical disks which are movable relative to each other in a direction opposite to the movement of the disks of the other pair for varying the speed ratio, and in which at least one disk of each pair is rotatably supported on a shaft by no more than two bearings, one of which extends substantially at a right angle to the forces which are exerted upon this disk by the driving belt when the speed ratio of the transmission is approximately 1:1.

Background of the invention

The present invention relates to a cone pulley transmission in which an endless driving element such as a belt or chain runs between two cone pulleys which are mounted on parallel shafts and each of which consists of a pair of conical disks which are nonrotatable relative to each other and one of which is fixed in the axial direction of its shaft, while the other disk is movable in the axial direction and connected to the shaft by means of a pressure-applying device which is either torque-responsive or both torque and speed ratio-responsive.

Due to the pressure-applying device it is unavoidable that the two pairs of conical disks will turn more or less relative to their respective shaft. The pressure-applying device which has the purpose of producing a pressure upon the axially movable disk in proportion to the prevailing torque and possibly also to the speed ratio to which the transmission is adjusted consists in its simplest form of two inclined surfaces between which rolling elements are provided. The torque is then transmitted from the shaft to the axially movable disk by means of these inclined surfaces and the rolling elements, and since this axially movable disk is nonrotatably connected to the axially fixed disk, the torque is also transmitted to this fixed disk. The torque is transmitted in the same manner in a transmission according to a modification of this construction which in place of gradually ascending inclined surfaces is provided with cams with a varying pitch and rolling elements between these cams. Depending upon the particular construction of the transmission, the conical disks will turn to a smaller or larger extent relative to their respective shaft and it is therefore necessary to mount the conical disks rotatably on their shafts. This is usually done by means of ball or roller bearings which are subjected to considerable stresses. In spite of these stresses, these bearings and the parts which are connected thereto should, however, be made of the smallest possible dimensions in order to prevent such a cone pulley transmission from exceeding a suitable size.

In the known constructions of such transmissions, each conical disk is provided with a hub and a pair of radial bearings which are spaced from each other and provided between the hub and the shaft. These radial bearings are adapted to take up the radial forces and also, except for the necessary bearing play, to prevent the conical disks from tilting. The axial forces acting upon the axially movable disk are taken up by the pressure-applying device, while those acting upon the fixed disk are taken up by an axial thrust bearing which is interposed between the end surface of the hub of this disk and a flange on the shaft. This construction has the disadvantage that the bearings at the ends of the hubs of the conical disks are subjected to very great stresses since the resultant force which is produced by the axial and radial forces and is exerted upon the conical disks acts in an inclined direction upon these two bearings, and since this resultant force which is derived from the driving element, i.e. a belt or chain, changes at every revolution of the conical disks. In view of the unavoidable bearing play, this results in a wobbling of the conical disks during their rotation and thus in an uneven running of these disks and a considerable wear upon their bearings. Furthermore, depending upon the size of the arc along which the driving element runs between the two conical disks of one pair, it is possible that the direction of the torque which is exerted by the conical disks upon the bearings might change. This, however, means that, in view of the necessary bearing play, vibrations will occur near the point of reversal of the torque which will also lead to the same result, namely, to an uneven running of the conical disks and a considerable wear upon their bearings.

Summary of the invention

It is an object of the present invention to overcome the above-mentioned disadvantages by mounting at least each fixed conical disk only on two bearings, at least one of which, namely, the bearing which takes up the axial forces, is designed so as to be free of any play and consists, for example, of an oblique bearing.

A cone pulley transmission with such bearings for the conical disks has the following advantages:

The oblique bearing which is disposed substantially at a right angle to the resultant force is much better capable to take up this force than any other bearing, and it may therefore be made of relatively small dimensions, even though it replaces the two bearings which in the known constructions are located near the end of the hub of the disk, namely, a radial bearing and an axial thrust bearing. Contrary to the radial bearing as previously employed, this oblique bearing is always free of any play since it is always acted upon by the resultant force. By omitting this radial bearing, it is also possible to make the hub of the conical disk and thus also the entire conical disk arrangement of a shorter length in the axial direction with the result that the total dimensions of the transmission will also be reduced. Consequently, the new bearing structure not only accomplishes the desired object of preventing the unsteady movement of the conical disks which in the previous structures was caused by the conventional types of bearings, and of thereby eliminating the progressively increasing bearing play resulting from wear, but by saving the need of a bearing it also has the advantage of permitting the total dimensions of the transmission to be reduced.

An additional reason for mounting the fixed conical disk in the manner in accordance with the invention is that such an oblique bearing may be mounted very easily and accurately between the end surface of the hub of this disk and a flange on the shaft. If this bearing is accurately mounted so as properly to support the fixed disk, it will also eliminate to the largest extent the mentioned disadvantages on the axially movable disk since this disk is braced upon the fixed disk by the driving element which runs between the two pairs of conical disks as the result of the axial pressure which is exerted upon the movable disk by the pressure-applying device. According to another feature of the invention it is, however, also possible to mount the axially movable disk in the inventive manner by providing the pressure-applying device in the form of a bearing which is free of any play, that is, a bearing which is directly opposed to the forces acting thereon and extends at a right angle to these forces.

A further feature of the invention provides that the two bearings which are associated with one or both conical disks of each pair are likewise designed by the provision of suitable supporting elements so as also to form bearings which are free of any play.

The above-mentioned as well as further features and advantages of the present invention will become more clearly apparent from the following detailed description thereof which is to be read with reference to the accompanying drawings, in which:

FIGURE 5 shows a similar cross section of the manner of mounting both conical disks of one pair in accordance with the invention;

FIGURE 6 shows a cross section similar to FIGURE 5 and of a similar manner of mounting the conical disks of one pair of the transmission according to the invention which, however, is provided with hydraulic means for adjusting the speed ratio; while FIGURE 7 shows a cross section similar to FIGURE 5, in which, however, both conical disks of one pair are mounted solely on bearings which are free of any play.

Figure 1:
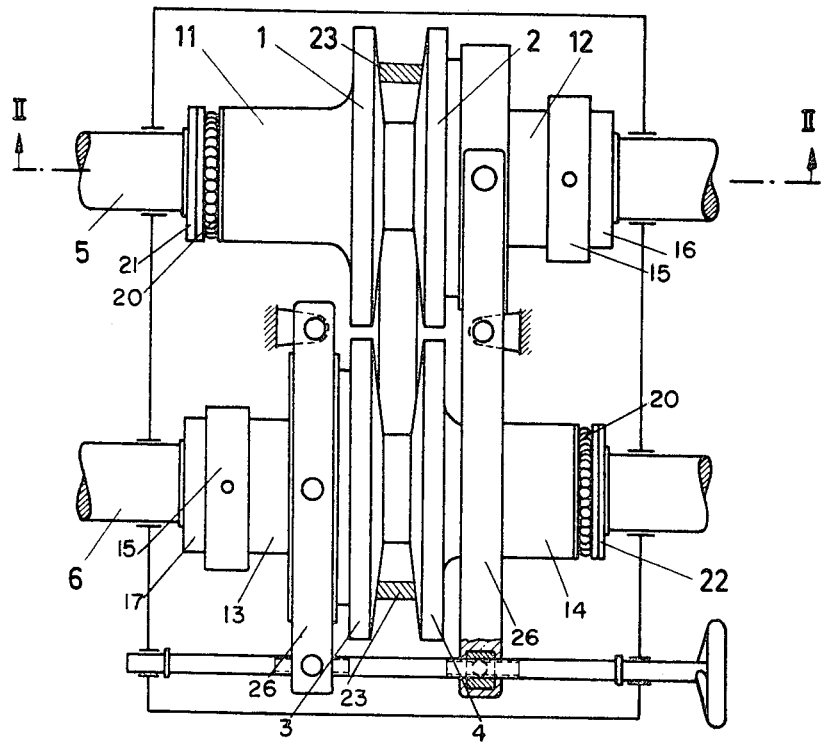
FIGURE 1 shows a diagrammatic elevation of a cone pulley transmission of the type to which the invention applies.
Figure 2:
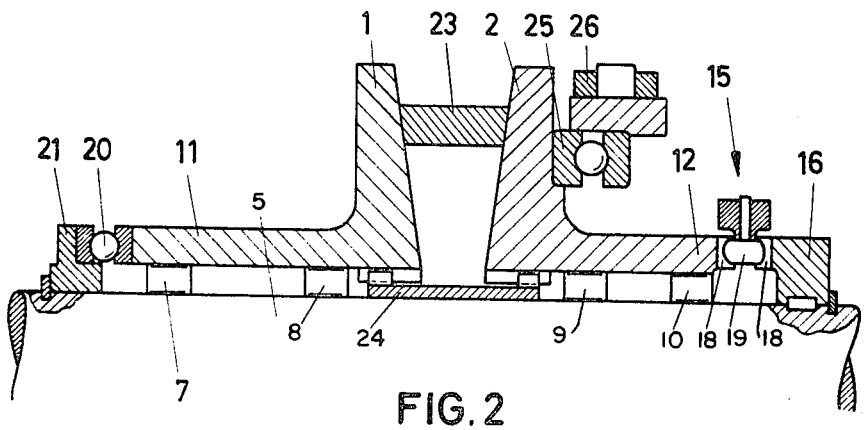
FIGURE 2 shows an enlarged partial cross section which is taken along the line II—II of FIGURE 1 and illustrates the conventional manner of mounting the two conical disks of each pair.

In the drawings, FIGURES 1 and 2 illustrate diagrammatically a cone pulley transmission of a conventional type which comprises two pairs of conical disks 1, 2 and 3, 4 which are mounted on their respective shafts 5 and 6 by means of radial bearings 7, 8 and 9, 10, respectively, which are interposed between the shafts 5 and 6 and a hub 11 to 14 on each of the conical disks 1 to 4. The free end of each hub 12 and 13 is acted upon in the axial direction by a pressure-applying device 15 which is supported on a flange 16 or 17 on shaft 5 or 6, respectively. The pressure-applying device 15 essentially consists of two inclined surfaces or cam members 18 between which a rolling element 19 is inserted. The axial force which is produced by the pressure-applying device 15 upon the hub 12 of disk 2 or the hub 13 of disk 3, and which is proportional to the torque of the respective shaft is taken up at the free end of the hub 11 or 14 of the other disk 1 or 4 of each pair by an axial thrust bearing 20 which is interposed between a flange 21 or 22 on shaft 5 or 6 and the end surface of hub 11 or 14. The two conical disks of each pair 1, 2 and 3, 4 are connected to each other by coupling means 24 so as to be nonrotatable but slidable in the axial direction relative to each other. The two pairs of conical disks 1, 2 and 3, 4 are connected by an endless driving element 23 such as a belt or chain. For varying the speed ratio of the transmission by changing the distances between the two conical disks of one pair in the opposite direction to those of the other pair, the two disks 2 and 3 are connected to each other by adjustable control levers 26 which act by means of thrust bearings 25 upon the disks 2 and 3.

Figure 3:
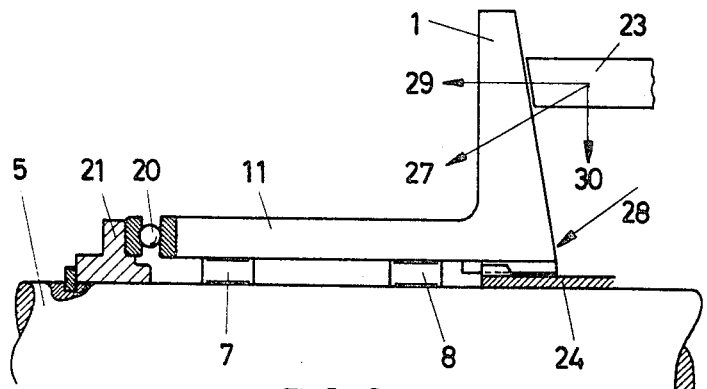
FIGURE 3 shows the parallelogram of forces which are produced by the driving element.

FIGURE 3 illustrates the direction of the force 27 which is the resultant of the axial force 29 and the radial or inwardly wedging force 30 of the driving element 23. This resultant force 27 produces a torque which has a supporting or "turning" point near the bearing 8 and also determines the load which is exerted upon the bearings 7 and 20. This torque may, however, change its direction so that the direction of force is also reversed at the radial bearing 7 when the driving element 23 runs along a small arc between the two conical disks 1 and 2 and when the resultant force 28 therefore acts upon a point underneath the "turning" point at the bearing 8. Due to the necessary bearing play, the conical disk 1 may then be affected by oscillations when the driving element 23 runs near this point. Since the two radial bearings 7 and 8 also determine the position of the conical disk 1 relative to the shaft 5, but this shaft might bend, there is a possibility that the balls of the thrust bearing 20 at one side of the latter will be subjected to a very heavy load, while the balls at the diametrically opposite side of the bearing might not even engage with their races, and that consequently this bearing will have a very short useful life.

Figure 4:
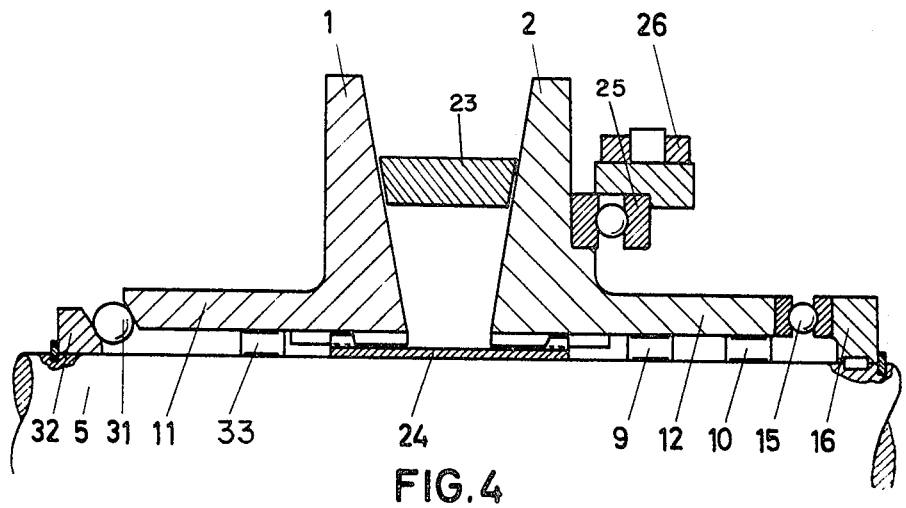
FIGURE 4 shows an enlarged partial cross section which is similar to that as shown in FIGURE 2 but illustrates particularly the manner of mounting the fixed conical disk of one of the cone pulleys in accordance with the invention.

FIGURE 4 illustrates the manner of mounting the axially fixed conical disk 1 in accordance with the invention. The hub 11 of disk 1 is in this case supported on an oblique bearing 31 which is interposed between the end surface of hub 11 and a flange 32 on shaft 5. Aside from this oblique bearing 31, there is only a single radial bearing 33 provided between the hub 11 and shaft 5. The resultant force 27, 28 acts in this case upon the oblique bearing 31 in a direction substantially at a right angle thereto and its bearing capacity is therefore utilized to the fullest possible extent. Due to the continuous pressure which is exerted upon the bearing 31, there will be absolutely no play within this bearing, and its entire peripheral area will now be uniformly acted upon regardless of the direction in which the resultant force 27, 28 may act when the driving element 23 is shifted to a different position.

FIGURE 5 illustrates not only an oblique bearing 34 which is free of any play and provided on the end surface of the hub 11 of the conical disk 1, but it also shows a pressure-applying device 35 which acts by means of rolling elements 37 upon inclined surfaces 36 on a flange on shaft 5 and on the end surface of hub 12 of the other conical disk 2. This pressure-applying device 35 carries out the functions of the radial bearing 10 and the pressure-applying device 15 according to FIGURE 4. The conical disk 2 may thus be mounted so as to be free of any play and the length of hub 12 may also be reduced. Aside from the oblique bearing 34 and the pressure-applying device 35, the only bearing means required by each pair of conical disks according to FIGURE 5 are the two radial bearings 38 and 39.

FIGURE 6 shows the conical pulley disks 1 and 2 mounted in a similar manner as shown in FIGURE 5, but in combination with hydraulic adjusting means for varying the speed ratio of the transmission. A hydraulic fluid may be supplied through a channel 40 to the area behind the conical disk 2 which acts as a piston for varying its distance from the conical disk 1. The inclined surface 42 is always maintained by a spring 41 in contact with the rollers 43 so that hard impacts upon the pressure-applying device 35, for example, at a sudden reversal of the direction of transmission, will be avoided.

A further embodiment of the invention is illustrated in FIGURE 7, which shows that the radial bearings for supporting the conical disks 1 and 2 may likewise be replaced by bearings 44 and 45 which are free of any play and consist in this case of inclined bearings in each of which a bearing race 46 or 47 is pressed by a cup spring 48 or 49 against the rollers of the inclined bearing. Thus, there will also be no play at these points, the conical disks 1 and 2 will therefore run perfectly smooth and steady, and the wear upon the bearings will be reduced to a minimum.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention what I claim is:

1. In a cone pulley transmission having a pair of opposite parallel shafts spaced from each other, a pair of conical disks forming a pulley on each shaft and nonrotatably connected to each other, an endless driving element between and engaging with said disks of each pair and connecting said two pulleys to each other, one of said disks of each pair being movable and the other disk being substantially fixed in the axial direction of its shaft, at least torque-responsive means for applying a pressure upon said movable disk in the direction toward the fixed disk of each shaft, and a plurality of radial and thrust bearings for rotatably supporting each pair of said disks on its shaft, wherein the improvement comprises the provision of no more than two of said bearings for supporting at least each of said fixed disks on its shaft, one of said bearings serving as a radial bearing and the other as a thrust bearing, at least said thrust bearing being designed so as to be free of any play during the operation of said transmission.

2. A cone pulley transmission as defined in claim 1, wherein said thrust bearings for supporting both disks of each pairs are designed so as to be free of any play.

3. A cone pulley transmission as defined in claim 1, wherein said thrust bearing at least of said fixed disk comprises bearing surfaces extending within planes disposed substantially at a right angle to the resultant force exerted by said driving element at least upon said fixed disk.

4. A cone pulley transmission as defined in claim 1, wherein the bearing surfaces of said bearings which are free of any play are obliquely inclined to the axis of said shaft.

5. A cone pulley transmission as defined in claim 1, wherein each conical disk on each shaft has a hub thereon, said radial bearing being interposed between said hub and said shaft, said thrust bearing at least of said fixed disk comprising a bearing race on the outer end surface of said fixed disk and disposed at an oblique angle to the axis of said shaft, an annular flange secured to said shaft and having a bearing race thereon also disposed at an oblique angle to the axis of said shaft, and rolling elements between and in constant engagement with said oblique races.

6. A cone pulley transmission as defined in claim 1, wherein said thrust bearing of said axially movable disk is likewise free of any play and forms a part of said pressure-applying device.

7. A cone pulley transmission as defined in claim 1, wherein the radial bearing of each conical disk is likewise designed so as to be free of any play.

8. A cone pulley transmission as defined in claim 1, wherein both bearings of each conical disk are designed so as to be free of any play.

References Cited

UNITED STATES PATENTS 2,514,824   7/1950   Young
3,052,132   9/1962   Dittrich et al.

C. J. HUSAR, *Primary Examiner.*